United States Patent

Krupotich

[15] 3,643,798
[45] Feb. 22, 1972

[54] MAIL WEIGHING AND SORTING MACHINE

[72] Inventor: Edward A. Krupotich, Palo Alto, Calif.
[73] Assignee: Bell and Howell Company, Sidney, Ohio
[22] Filed: Feb. 27, 1970
[21] Appl. No.: 15,088

[52] U.S. Cl. .................................................209/74, 209/121
[51] Int. Cl. ...........................................................B07c 5/18
[58] Field of Search.....................209/73, 74, 121; 198/31 A; 177/16, 52

[56] References Cited

UNITED STATES PATENTS

| | | | |
|---|---|---|---|
| 2,883,033 | 4/1959 | Armstrong | 198/31 A |
| 3,275,135 | 9/1966 | Niese | 209/74 |
| 3,434,555 | 3/1969 | Wyatt | 177/52 |

*Primary Examiner*—Richard A. Schacher
*Attorney*—Griffin, Branigan and Kindness

[57] ABSTRACT

A synchronizing station sequentially interrupts the travel of serially fed pieces of mail so that they are both aligned and sequentially delivered to a weighing station one at a time. A means at the weighing station generates a signal representing a weight category for each piece of mail and delivers each signal to a memory. The pieces of mail are then moved in a first direction along a track having segments that are selectively pivotable upwardly by means operative in response to signals from the memory. In this manner, selected track segments are thusly pivoted to direct pieces of mail onto separate secondary track segments adapted to move the mail in a second direction. Each secondary track segments is also selectively pivotable about a horizontal axis to selectively direct given pieces of mail along either first or second planes into corresponding first or second bins.

A means is also provided for changing the weight range of the weighing station so that the above described structure is adapted for use with mail falling within a plurality of weight ranges.

13 Claims, 6 Drawing Figures

INVENTOR
EDWARD A. KRUPOTICH

INVENTOR
EDWARD A. KRUPOTICH

INVENTOR
EDWARD A. KRUPOTICH

BY Griffin, Branigan & Kindness
ATTORNEYS

MAIL WEIGHING AND SORTING MACHINE

Conventional methods of automatically sorting mail by either destination or weight have resulted in electronically and mechanically complex structures that are both too expensive and too large for use in many business environments. In the alternative, conventional mail weighing and sorting machines have required a great deal of manual operation or have been unduly slow so as to be unsatisfactory for use in the current business community. It is an object of this invention, therefore, to provide a mail weighing and sorting machine that is substantially automatic and low cost while at the same time being adapted to handle the large volumes of mail that are generated by large business houses and banks.

Several mail weighing and sorting machines are currently available wherein each piece of mail is first separately weighed and then directed along a relatively lengthy track where means are provided for selectively removing pieces of mail from the track at designated locations in accordance with the weight of each given piece as determined by the weighing station. This type of structure, however, has resulted in the various mail pieces having to travel over a long distance, particularly where the mail is to be sorted into more than three or four weight categories. Consequently, where it is desired to sort mail into a large number of weight categories, the resulting structures have been unduly long and cumbersome in addition to requiring a lengthy time period for the various pieces of mail to complete their sorting procedures. It is another object of the invention, therefore, to provide a more compact and versatile mail weighing and sorting machine wherein the various pieces of mail are able to be sorted into a larger number of weight categories without having to traverse such a long sorting track.

SUMMARY OF THE INVENTION

In accordance with principles of the invention, synchronizing and weighing stations are followed by a segmented sorting track that is adapted to move the pieces of mail serially in a first direction over the various track segments. The track segments, however, are adapted to have their scale-side edges pivoted upwardly to selectively direct given pieces of mail onto secondary sorting tracks in response to signals from the weighing station corresponding to each given piece of mail. The secondary tracks are adapted to move the mail pieces in selected sorting planes which are also determined by signals from the weighing station generated in response to each given piece of mail. In this manner, each main track segment is adapted to accommodate mail pieces falling within different weight categories; and, the secondary tracks further sort the pieces of mail directed thereto into their various weight categories without requiring a separate pass through the machine.

BRIEF DESCRIPTION OF THE DRAWINGS

The foregoing and other objects, features, and advantages of the invention will be apparent from the following more particular description of a preferred embodiment of the invention as illustrated in the accompanying drawings, wherein the same reference characters refer to the same parts throughout the various views. The drawings are not necessarily drawn to scale. Instead they are merely presented so as to illustrate the principles of the invention in a clear manner.

DETAILED DESCRIPTION

Figure 1:
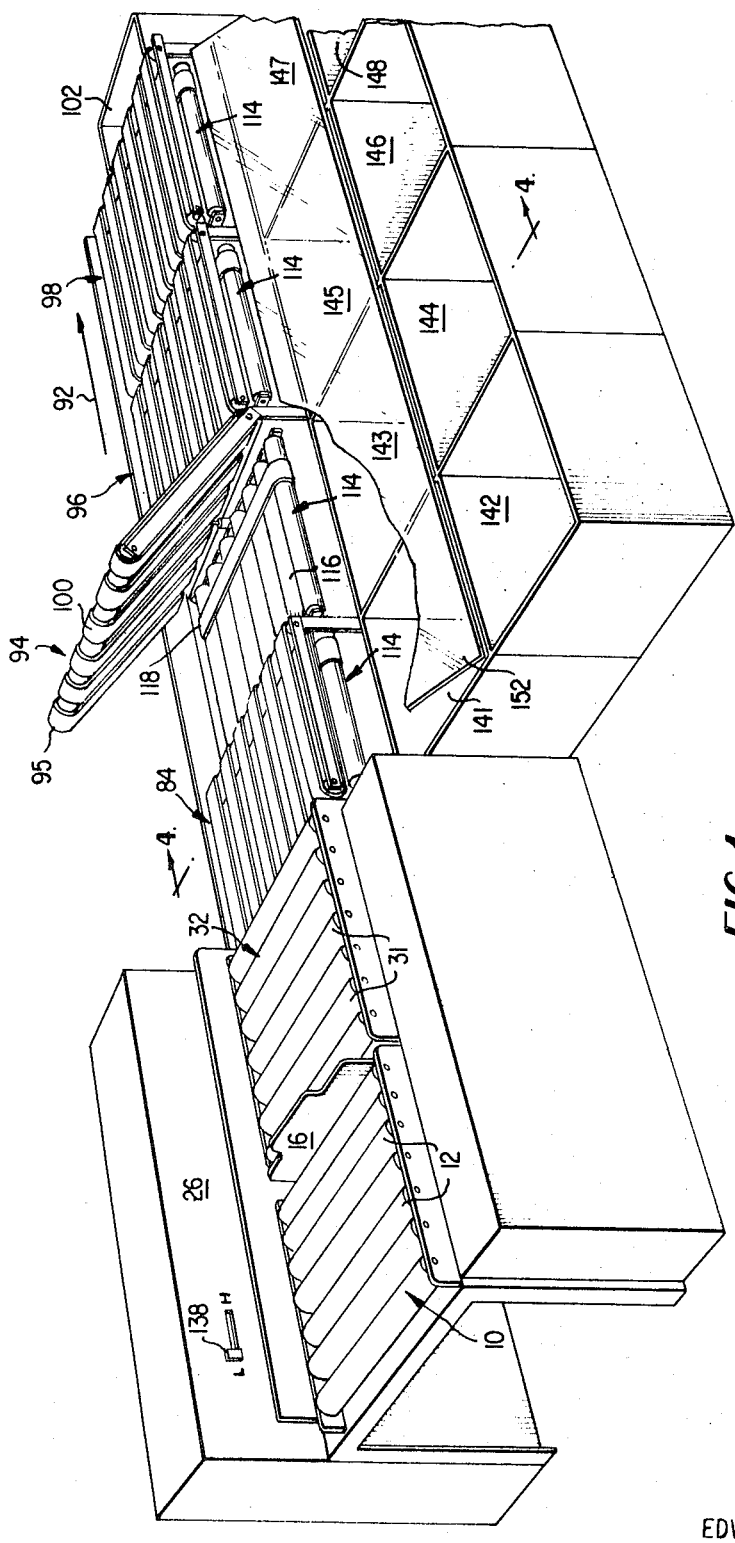
FIG. 1 is a schematic pictorial view of a mail weighing and sorting machine of the invention.
Figure 2:
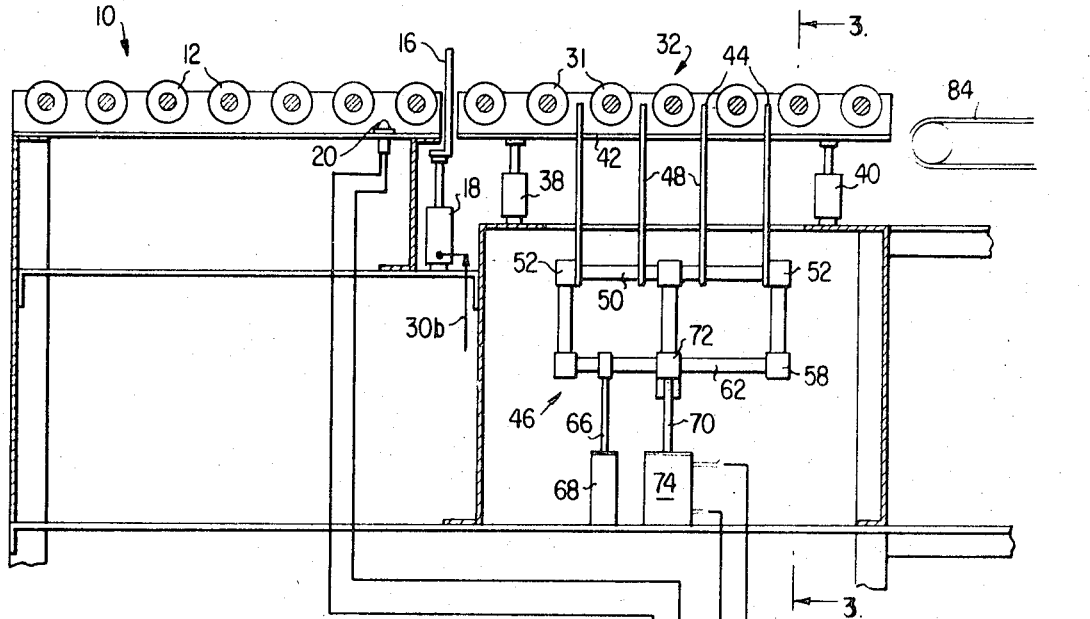
FIG. 2 is a schematic vertical sectional view through the synchronizing and weighing stations of the apparatus illustrated in FIG. 1.
Figure 3:
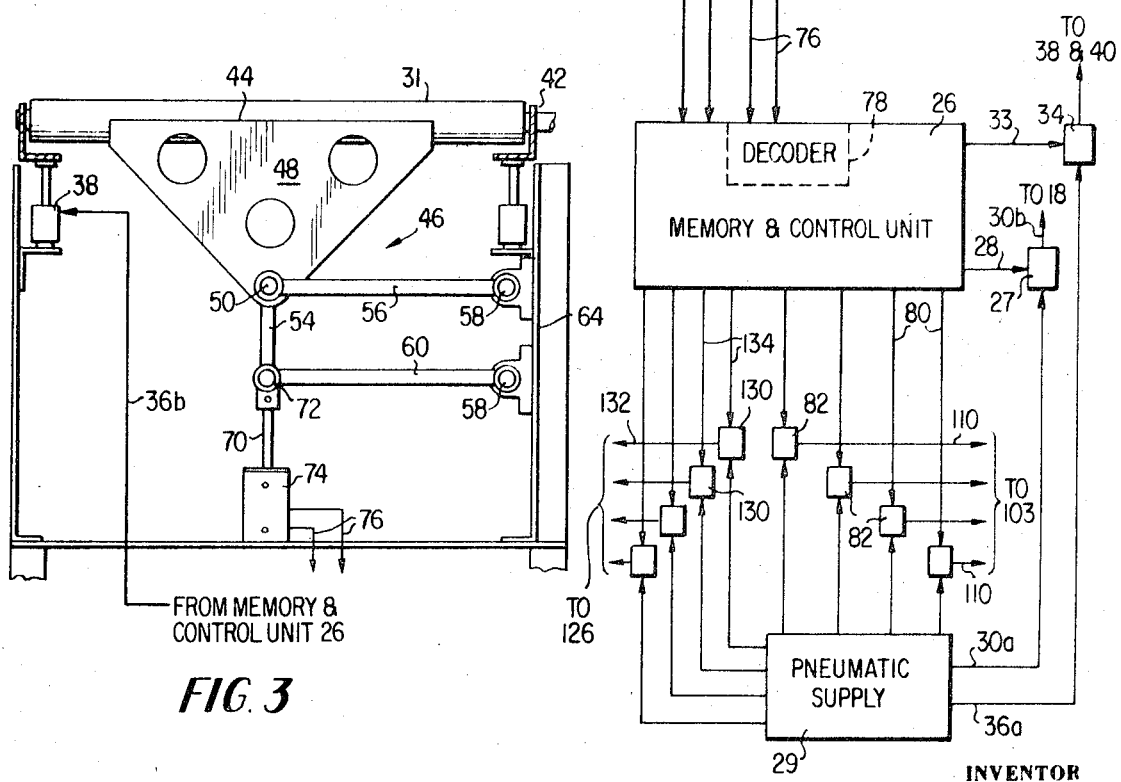
FIG. 3 is a schematic vertical sectional view taken along the lines 3—3 of FIG. 2.
Figure 6:
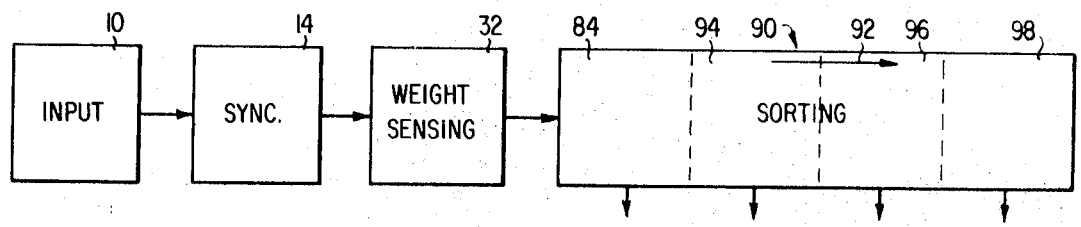

As shown in FIGS. 1 and 6, the illustrated embodiment includes an input section 10 where pieces of mail are placed serially one at a time either manually or by a suitable automatic feeding means not shown. Rollers 12 on the input station direct each piece of mail to a synchronizing station 14 represented by a synchronizing plate 16 that is vertically moveable by a pneumatic actuator 18 (FIG. 2). In this respect, as each piece of mail is fed toward the plate 16, it passes over a photocell 20 (FIG. 2) which reflectively senses the presence of a piece of mail and delivers a signal representative thereof on lines 22 and 24 to a memory and control unit 26 as shown in FIG. 2

Depending upon the distance from the photocell 20 to the plate 16, a predetermined time after the photocell detects the presence of a given piece of mail, a solenoid 27 receives a signal from the memory and control unit 26 on line 28 to direct air pressure from a pneumatic supply 29 along lines 30a and 30b to the pneumatic actuator 18 which moves the plate 16 downwardly. The given piece of mail, which has been aligned by the plate 16, is then passed onto a second set of rollers 31 located at a weighing station 32. When the piece of mail is moved from over the photocell 20, the signals on lines 22 and 24 change and the memory unit 26 directs a signal on line 28 for the solenoid 27 to remove air pressure from the pneumatic actuator 18 to move the plate 16 upwardly again to both align a second piece of mail and prevent its passage onto the weighing station 32. At the same time, the memory delivers a signal on line 33 to a solenoid 34 which directs air from pneumatic supply 29 along lines 36a and 36b to a set of pneumatic actuators 38 and 40 which move the rollers 31 and associated bracket structure 42 downwardly so that the given piece of mail rests upon knife edges 44 of a scale assembly 46.

In the above-described manner, the synchronizing plate 16 is operative to both align various pieces of mail as they are driven thereagainst by the rollers 12 and insure that only one piece of mail at a time is delivered to the weighing station 32. The photocell 20, on the other hand, is operative to both control the vertical motion of the synchronizing plate 16 and the vertical motion of the rollers 31 so as to place each piece of mail on the knife edges 44 of the scale assembly 46.

The knife edges 44 form one edge each of a plurality of triangular elements 48 affixed to a shaft 50 which, in turn, is connected by fluxural pivots 52 to pivoted frame members 54 and 56. Similarly, these frame members are connected by flexural pivots such as 58 to other frame members 60 and 62 and the weighing and sorting machine's main frame 64.

A shaft 66 extends downwardly from the frame member 62 into a suitable variably adjustable dampening means such as adjustable dash pot 68. Similarly, a shaft 70 extends downwardly from flexural pivot 72 into a linear voltage differential transformer (LVDT) 74. In this respect, one such structure that has been found to be satisfactory provided a maximum downward travel of the shaft 70 (and knife edges 44) of about one-half inch and used an LVDT having an output range on lines 76 to the memory and control unit 26 of about 0 to 5 volts; or about 350 to 360 millivolts per ounce of a given piece of mail placed on the knife edges 44.

By means of the above-described structure, it will be appreciated that the magnitude of each signal delivered on lines 76 to the memory and control unit 26 represents the weight of each given piece of mail placed on the knife edges 44. These signals are compared in a suitable decoder circuit 78 in the memory and control unit 26 which produces output pulses on lines 80 to track solenoid controls 82 in a manner to be described shortly. In this respect, the pulses on lines 80 are delivered at predetermined time intervals after generation of the signals on lines 76 wherein the intervals depend upon the magnitude of the LVTD's output signals as interpreted by the decoder section 78 of the memory and control circuits of the unit 26. These circuits, however, can be any one of a host of suitable such devices, form no part of the instant invention, and, therefore, are merely functionally described herein.

After the memory and control unit receives the LVDT's output signals on lines 76, it delivers another signal on line 33 to the solenoid 34 for removing pressure from the actuators 38 and 40 which move the rollers 31 and associated brackets 42 upwardly to lift the given piece of mail off of the knife edges 44 so that the LVDT's output again drops to zero. At the same time, the rollers 31 which are suitably driven by a means not shown, propel the piece of mail forwardly onto a first segment 84 of a first sorting track 90 which moves each given piece of mail in a direction of an arrow 92 (FIGS. 1 and 6). In the absence of intervening signals such as are to be described shortly, each given piece of mail is then carried along the first track 90 over segmented portions 94, 96, and 98 thereof by means of suitably driven belts 100 so as to deposit the given piece of mail in an overweight bin 102 (FIG. 1).

Figure 4:
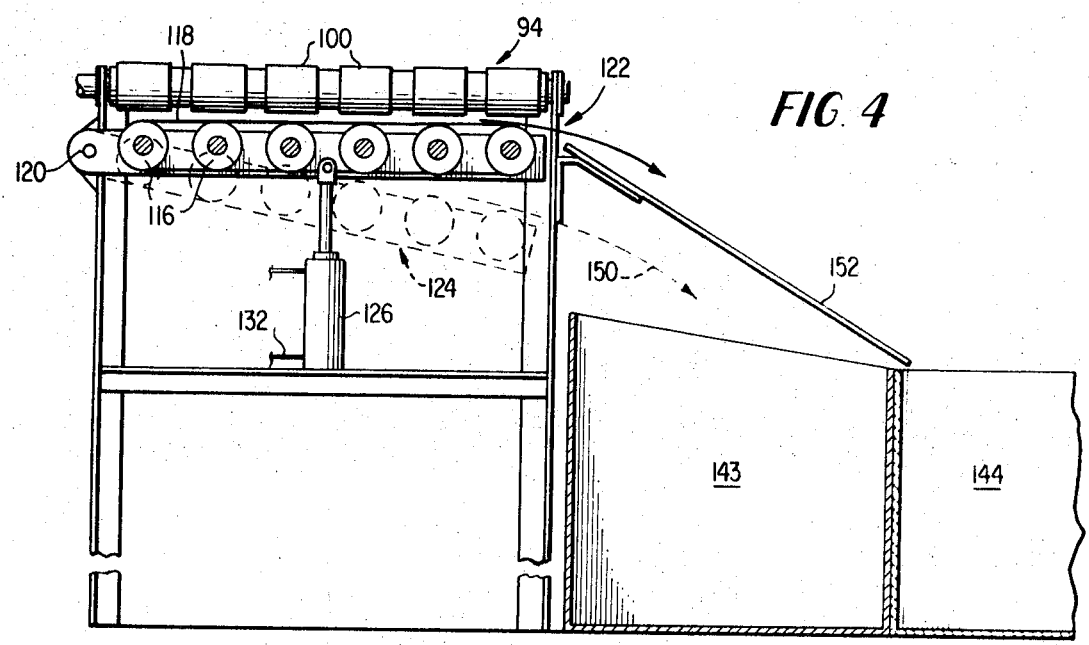
FIG. 4 is a schematic sectional view taken along the lines 4—4 in FIG. 4 illustrating a two-position secondary sorting track.
Figure 5:
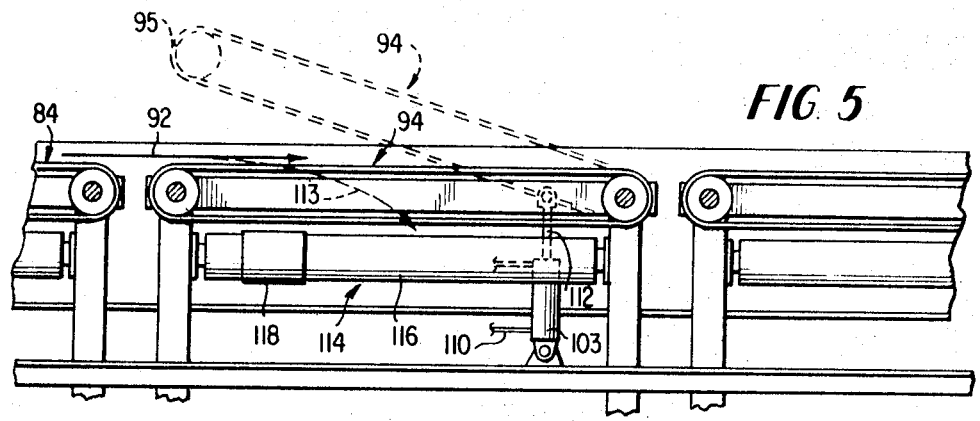
FIG. 5 is a fragmentary vertical sectional view illustrating pivotal motion of one of the segmented portions of the primary sort track; and, FIG. 6 is a block diagram illustrating the overall machine of the invention.

Each of the segmented portions of the main track 90 is adapted to be pivoted upwardly at its end nearest the weighing station 32 by means of an associated main track actuator 103 (FIG. 5). In this respect, the main track actuators such as 103 are controlled by a corresponding solenoid such as 82 to direct air from the pneumatic supply 29 along a line such as 110 to move an associated plunger such as 112 upwardly causing the end nearest the weighing station of a main track segment such as 94 to also move upwardly. In this manner, a given piece of mail is diverted downwardly in the direction of an arrow 113 in FIG. 5 onto one of a plurality of secondary feed tracks 114 (see also FIG. 1). Each of the secondary feed tracks is comprised of a plurality of rollers 116 driven by belts such as 118; and, each of the secondary feed tracks is pivoted along one side such as at 120 in FIG. 4 and moveable into at least first and second positions 122 and 124, respectively, by a pneumatic actuator such as 126 in FIG. 4.

In the above regard, the various pneumatic actuators 126 are controlled by the selective direction of air thereto from pneumatic supply 29 by respective solenoids such as 130 on lines such as 132 wherein the solenoids 130 are, in turn, under control of signals delivered along lines 134 from the memory and control circuit 26. Hence, the secondary sorting tracks 114 are selectively moveable into first and second positions 122 and 124, respectively, by pneumatic actuators 126 in response to signals from the memory and control unit 26 which decodes the signals it receives from the LVDT 74.

In operation, after a given piece of mail is permitted to pass onto the weighing station 32 by depression of the synchronizing plate 16, the rollers 30 are dropped by pneumatic actuators 38 and 40 in response to a signal from photocell 20. The weight of the piece of mail causes the shaft 70 to move downwardly by an amount proportional to the weight so that the LVDT 74 provides output signals on lines 76 in proportion to the weight of a piece of mail.

As noted above the weight signals from the LVDT are delivered to the decoder 78 which, by means of a suitable switch 138 (FIG. 1) is adapted to receive the signals in either a low weight range portion or a high weight range portion depending upon the type of mail that is being weight sorted at any given time. For example, as will now be described, the illustrated embodiment sorts mail into one or another of eight bins 141 through 148 which receive the sorted pieces of mail. When the low weight section of the decoder 78 is used, bin 41 receives mail weighing up to 1 ounce; bin 142 receives mail weighing between 1 ounce and 2 ounces; and so on until bin 148 receives mail weighing between 7 and 8 ounces. All pieces of mail weighing over 8 ounces are deposited in the overweight bin 102.

As a practical matter, relatively few pieces of mail weigh more than 8 ounces, but after the bin 102 becomes full, the switch 138 is changed to its high weight range position so that the signals from the LVDT are directed to the high weight range portion of the decoder 78. Under these conditions, subsequently fed pieces of mail weighing up to 9 ounces are delivered to bin 141; pieces between 9 ounces and 10 ounces are delivered to bin 142; and so on until pieces weighing between 15 and 16 ounces are delivered to bin 148; and pieces weighing over 1 pound are delivered to the overweight bin 102. In this respect, although no further weight ranges will be discussed herein, it will be apparent to those skilled in the art that additional ranges can easily be accommodated by merely adding additional decoder section, which, as noted above, can be of a conventional type.

A more detailed consideration will now be made of the illustrated embodiment's operation as it sorts pieces of mail into its various weight categories between 1 and 8 ounces. In this regard, the decoder directs output signals to selected shift registers or other such devices in the memory unit 26 in accordance with the magnitude of the signals it receives on lines 76 from the LVDT. When the decoder receives a signal corresponding to a piece of mail weighing between 2 and 4 ounces, for example, it directs a signal to a shift register or the like for producing a signal on one of the lines 80. These signals control the solenoid 82 which directs air pressure to the pneumatic actuator 103 for the second segmented portion 94 of the main feed track 90 so that the scale end 95 thereof moves upwardly as illustrated in FIGS. 1 and 5 just as the given piece of mail is about to pass thereover along line 92. In this manner, the given piece of mail is fed by the first segmented track portion 84 onto the rollers 116 and belt 118 of the secondary feed track 114 located under the primary track segment 94.

At the same time as the memory unit delivers its signal on the proper line 80 for causing the end 95 of the segmented portion 94 of the main feed track to be moved upwardly, the memory unit also delivers a signal on the proper line 134 (FIG. 2) to the solenoid 130 corresponding to the pneumatic actuator 136 for pivoting the second secondary feed track upwardly or downwardly about axis 120 in FIG. 4. In this regard, if the given piece of mail weighs between 2 and 3 ounces, the decoder causes the memory unit's output to be such that the proper solenoid 130 directs air to the corresponding solenoid 126 for lowering the second secondary feed track into the position illustrated in dotted lines in FIG. 4. In this manner, the piece of mail is directed downwardly along the path of dotted arrow 150 and into the 2-3 ounce bin 143. If, on the other hand, the LVDT's output signal indicates that the given piece of mail weighs between 3 and 4 ounces, the decoder directs the memory unit's output on the proper line 134 to be such that the corresponding solenoid 130 remains unactuated and the associated pneumatic actuator 126 maintains the second secondary feed track in its upper position in FIG. 4. In this manner, the given piece of mail is directed outwardly along the direction of arrow 122, over a transparent deflector plate 152, and into the 3-4 ounce bin 144.

In the same manner as has just been described, the first segmented portion 84 of the main feed track 90 pivots upwardly at its scale end as mail pieces weighing under 2 ounces are about to pass thereover; the third segmented portion 96 of the main feed track pivots upwardly at its scale end when 5-6 ounce pieces of mail are about to pass thereover; the last segmented portion 98 of the main feed track pivots upwardly at its scale end when its 7-8 ounce pieces of mail are about to pass thereover; and none of the segmented portions are pivoted in the event that the scale weighs a piece of mail weighing over 8 ounces so that all pieces greater than 8 ounces are deposited in the overweight bin 102. Also similarly, the memory unit produces suitably timed signals on lines 134 so that the corresponding actuators 126 move the bin ends of the associated secondary feed tracks downwardly when the weights of the various pieces of mail are such that they should be directed into bins 141, 143, 145, or 147.

When the high weight range portion of the decoder 78 is selected, the same memory unit output lines and actuating mechanisms are used. The only difference is that the various actuators are operated in response to the weighing of different weight ranges of the mail. For example, the second segmented portion 94 of the main feed track is pivoted upwardly just as pieces of mail weighing 10 or 11 ounces are about to pass thereover; and the second secondary track is moved downwardly as a 10 ounce piece of mail is placed thereon so as to direct it into bin 143. The remaining track segments operate in a similar manner.

It will be appreciated by those skilled in the art that the above described structure provides a relatively simple and compact mail weighing and sorting machine that is adapted to handle large volumes of mail. In this regard, it should be noted that the segmented track aspects of the invention combined with the use of both primary and secondary feed tracks, result in a device that provides many sort categories without the undue length which prior art devices require in order to accommodate the same number of sort categories. Moreover, it will be appreciated by those skilled in the art that more sort categories can be obtained for the same overall machine length merely by adapting the secondary feed tracks for adjustment into more than two planes such as those illustrated by the solid and dotted positions of the rollers 118 in FIG. 4.

While the invention has been particularly shown and described with reference to a preferred embodiment thereof, it should be noted that various changes in form and detail may be made therein without departing from the spirit and scope of the invention. For example, in addition to the provision for adjusting the secondary feed tracks into various planes, the decoder 78 can be provided with additional sections to accommodate more weight ranges; and, of course, additional main track segments can be added if desired. Also, the track segments can be pivoted by other means such as selectively operated motor or clutch arrangements, so that the pneumatic supply can be eliminated, for example.

The embodiments of the invention in which an exclusive property or privilege is claimed are defined as follows:

1. A mail weighing machine comprising:
    a segmented main feed track for moving pieces of mail in seriatim past a plurality of stations including:
        a weighing station; and,
        a plurality of sorting stations;
    means for sequentially delivering said pieces of mail to said weighing stations one at a time;
    control means;
    means associated with said weighing station for weighing each given piece of mail, generating a weight signal representing the weight thereof, and delivering said signal to said control means;
    said segmented main track including a plurality of moveable portions each associated with a given one of said sorting stations and adapted for motion to prevent selected pieces of mail from passing thereover;
    a secondary feed track associated with at least one of said moveable segments of said main feed track and adapted to direct pieces of mail placed thereon in a direction different than that of said main feed track;
    said control means being operative in response to receipt of said weight signals for causing selected such segmented portions of said main feed track to undergo said motion for preventing passage of the given piece of mail thereover and directing said given piece of mail to the corresponding secondary feed track for moving said given piece of mail in said different direction.

2. The apparatus of claim 1 wherein said segmented portions of said main track are pivoted about a horizontal axis so that the ends thereof nearest said weighing station are selectively pivoted upwardly out of the plane of said main track.

3. The apparatus of claim 1 wherein said secondary feed track is located beneath the associated segmented portion of said main track and wherein the direction of travel of a given piece of mail directed thereto is at right angles to the direction of travel along said main track.

4. The apparatus of claim 3 wherein said segmented portions of said main track are pivoted about a horizontal axis so that the ends thereof nearest said weighing station are selectively pivoted upwardly out of the plane of said main track.

5. The apparatus of claim 1 wherein said secondary feed track is selectively pivotable from a first plane to a second plane so that mail placed thereon is adapted to be selectively directed into first and second sorting areas.

6. The apparatus of claim 5 wherein said secondary feed track is located beneath the associated segmented portion of said main track and wherein the direction of travel of a given piece of mail directed thereto is at right angles to the direction of travel along said main track.

7. The apparatus of claim 6 wherein said segmented portions of said main track are pivoted about a horizontal axis so that the ends thereof nearest said weighing station are selectively pivoted upwardly out of the plane of said main track.

8. The apparatus of claim 1 wherein said mail is moved along said main track by means of separate moving belt means on each of said segmented portions.

9. The apparatus of claim 8 wherein said secondary feed track is selectively pivotable from a first plane to a second plane so that mail placed thereon is adapted to be selectively directed into first and second sorting areas.

10. The apparatus of claim 9 wherein said mail is moved in said different direction on said secondary feed track by moving belt means.

11. The apparatus of claim 1 wherein each of said segmented portions of said main track has a secondary feed track associated therewith, said segmented portions being pivoted about horizontal axes so that the ends thereof nearest said weighing station are selectively pivoted upwardly out of the plane of said main track;
    said secondary feed tracks being selectively pivoted about a horizontal axis that is orthogonally disposed with respect to the axis about which the associated segmented portion is pivoted so that each given secondary feed track is adapted to direct mail placed thereon at right angles to the direction of travel of said main track and for selectively directing the mail placed thereon into first or second sorting areas.

12. The apparatus of claim 11 wherein said mail is moved along said main track by means of separate moving belt means on each of said segmented portions.

13. The apparatus of claim 12 wherein said mail is moved in said different direction on said secondary feed track by moving belt means.

* * * * *